(12) United States Patent
Koo et al.

(10) Patent No.: US 11,199,503 B2
(45) Date of Patent: Dec. 14, 2021

(54) METHOD AND DEVICE FOR ADJUSTING QUALITY DETERMINATION CONDITIONS FOR TEST BODY

(71) Applicant: KOH YOUNG TECHNOLOGY INC., Seoul (KR)

(72) Inventors: Dae Sung Koo, Gwangmyeong-si (KR); Yong Kim, Seoul (KR); Ki Won Park, Gwangmyeong-si (KR)

(73) Assignee: KOH YOUNG TECHNOLOGY INC., Seoul (KR)

( * ) Notice: Subject to any disclaimer, the term of this patent is extended or adjusted under 35 U.S.C. 154(b) by 295 days.

(21) Appl. No.: 16/349,802

(22) PCT Filed: Nov. 3, 2017

(86) PCT No.: PCT/KR2017/012408
§ 371 (c)(1),
(2) Date: May 14, 2019

(87) PCT Pub. No.: WO2018/088760
PCT Pub. Date: May 17, 2018

(65) Prior Publication Data
US 2019/0376906 A1 Dec. 12, 2019

(30) Foreign Application Priority Data

Nov. 14, 2016 (KR) .................. 10-2016-0151400

(51) Int. Cl.
*G01N 21/88* (2006.01)
*G01N 35/00* (2006.01)

(52) U.S. Cl.
CPC . *G01N 21/8851* (2013.01); *G01N 2021/8854* (2013.01); *G01N 2021/8887* (2013.01); *G01N 2035/0091* (2013.01)

(58) Field of Classification Search
CPC ....... G01N 21/8851; G01N 2021/8854; G01N 2035/0091
See application file for complete search history.

(56) References Cited

U.S. PATENT DOCUMENTS 5,555,316 A * 9/1996 Tsujikawa ............. G06T 7/0006
348/126
6,825,856 B1 * 11/2004 Fazzio ................. G05B 19/401
345/646

(Continued)

FOREIGN PATENT DOCUMENTS

| EP | 1 264 221 | 8/2005 |
| JP | 11-258180 | 9/1999 |

(Continued)

OTHER PUBLICATIONS

S. Biffl and W. Grossmann, "Evaluating the accuracy of defect estimation models based on inspection data from two inspection cycles," Proceedings of the 23rd International Conference on Software Engineering. ICSE 2001, 2001, pp. 145-154, doi: 10.1109/ICSE.2001.919089. (Year: 2001).*

(Continued)

*Primary Examiner* — Michael Robert Cammarata
(74) *Attorney, Agent, or Firm* — Kile Park Reed & Houtteman PLLC

(57) ABSTRACT

A method for adjusting a condition for determining a quality of an inspection object comprises: acquiring measurement values for the structures of a plurality of inspection objects; determining whether each of the plurality of inspection objects is good or defective by comparing error values of the measurement values with respect to design values with a predetermined reference value; identifying one or more inspection objects in which determination error has occurred among the plurality of inspection objects; generating and outputting an inspection result graph including the number (Continued)

of inspection objects according to the error values, the reference value, and the number of the one or more inspection objects in which the determination error has occurred; updating the reference value according to a graphical input; and redetermining whether each of the plurality of inspection objects is good or defective by comparing the error values with the updated reference value.

18 Claims, 10 Drawing Sheets

(56) References Cited

U.S. PATENT DOCUMENTS

| | | | | |
|---|---|---|---|---|
| 8,224,605 | B2* | 7/2012 | Tasaki | H05K 13/083 |
| | | | | 702/83 |
| 9,091,668 | B2* | 7/2015 | Hong | G01B 11/24 |
| 9,124,810 | B2* | 9/2015 | You | H04N 5/2351 |
| 2002/0009220 | A1* | 1/2002 | Tanaka | G01N 21/94 |
| | | | | 382/145 |
| 2003/0083756 | A1 | 5/2003 | Hsiung et al. | |
| 2005/0019946 | A1* | 1/2005 | Tuchman | G01J 3/28 |
| | | | | 436/171 |
| 2005/0246045 | A1* | 11/2005 | Sugihara | G06Q 10/06 |
| | | | | 700/109 |
| 2005/0273720 | A1* | 12/2005 | Cochran | G05B 19/41875 |
| | | | | 715/751 |
| 2006/0115143 | A1* | 6/2006 | Auerbach | G01N 21/95607 |
| | | | | 382/149 |
| 2006/0271226 | A1* | 11/2006 | Tasaki | G05B 19/41875 |
| | | | | 700/109 |
| 2007/0005266 | A1* | 1/2007 | Blevins | H04L 67/289 |
| | | | | 702/22 |
| 2009/0073440 | A1* | 3/2009 | Tiemeyer | G01N 21/9501 |
| | | | | 356/338 |
| 2010/0004875 | A1* | 1/2010 | Urano | G01N 21/4738 |
| | | | | 702/40 |
| 2012/0185221 | A1* | 7/2012 | Mori | H05K 13/083 |
| | | | | 703/2 |
| 2015/0227139 | A1 | 8/2015 | Yamamoto et al. | |
| 2018/0284739 | A1* | 10/2018 | Ueda | G05B 19/41875 |
| 2020/0116651 | A1* | 4/2020 | Koo | G01N 21/8851 |
| 2021/0247324 | A1* | 8/2021 | Naruse | G06N 20/00 |

FOREIGN PATENT DOCUMENTS

| | | |
|---|---|---|
| JP | 2001-183307 | 7/2001 |
| JP | 2006-317266 | 11/2006 |
| JP | 2010-230452 | 10/2010 |
| JP | 2012-127973 | 7/2012 |
| JP | 2012-151251 | 8/2012 |
| JP | 2013-108798 | 6/2013 |
| WO | 2017/168507 | 10/2017 |

OTHER PUBLICATIONS

Heideklang R, Shokouhi P. Decision-Level Fusion of Spatially Scattered Multi-Modal Data for Nondestructive Inspection of Surface Defects. Sensors (Basel). 2016;16(1):105. Published Jan. 15, 2016. doi:10.3390/s16010105 (Year: 2016).*
Hui-Fuang Ng, "Automatic thresholding for defect detection," Third International Conference on Image and Graphics (ICIG'04), 2004, pp. 532-535, doi: 10.1109/ICIG.2004.43. (Year: 2004).*
Korean Office Action with English translation; corresponding to Korean Application No. 10-2019-0057238, dated May 27, 2019.
Japanese Office Action, with English translation, corresponding to Japanese Patent Application No. 2019-525739, dated Feb. 24, 2021.
Chinese Office Action, with English translation, corresponding to Chinese Application No. or Publication No. 201780070386.5, dated Mar. 24, 2021.
Extended European Search Report, corresponding to European Application No./Patent No. 17869347.9, dated Jun. 15, 2020.
Japanese Office Action, with English translation, corresponding to Japanese Patent Application No. 2019-525739, dated Jul. 7, 2020.
Korean Office Action, with English translation, corresponding to Korean Applicatoin No. 10-2020-0006453, dated Feb. 6, 2020.
International Search Report for International Application No. PCT/KR2017/012408, dated Jun. 28, 2018.
Korean Office Action with English translation for Korean Application No. 10-2016-0151400, dated Jun. 25, 2018.
Korean Notice of Final Rejection with English translation for Korean Application No. 10-2016-0151400, dated Feb. 1, 2019.
Written Opinion with English translation for International Application No. PCT/KR2017/012408, dated Jun. 28, 2018.

* cited by examiner

FIG. 4

| Inspection object ID | Inspection target | Measurement target | Measurement value (mm) | Error value (mm) | Result of quality determination | Result of determination review |
|---|---|---|---|---|---|---|
| 1 | Pad 1 | Width | 9.6 | 0.4 | Good (warning) | ... |
| 1 | Pad 1 | Length | 9.7 | 0.3 | Good | ... |
| 2 | Pad 1 | Width | 8.8 | 1.2 | Defective | ... |
| 2 | Pad 1 | Length | 10.1 | 0.1 | Good | ... |
| ... | ... | ... | ... | ... | ... | ... |
| 459 | Pad 1 | Width | 9.4 | 0.6 | Defective | False call |
| 459 | Pad 1 | Length | 10.5 | 0.5 | Good | Escape |

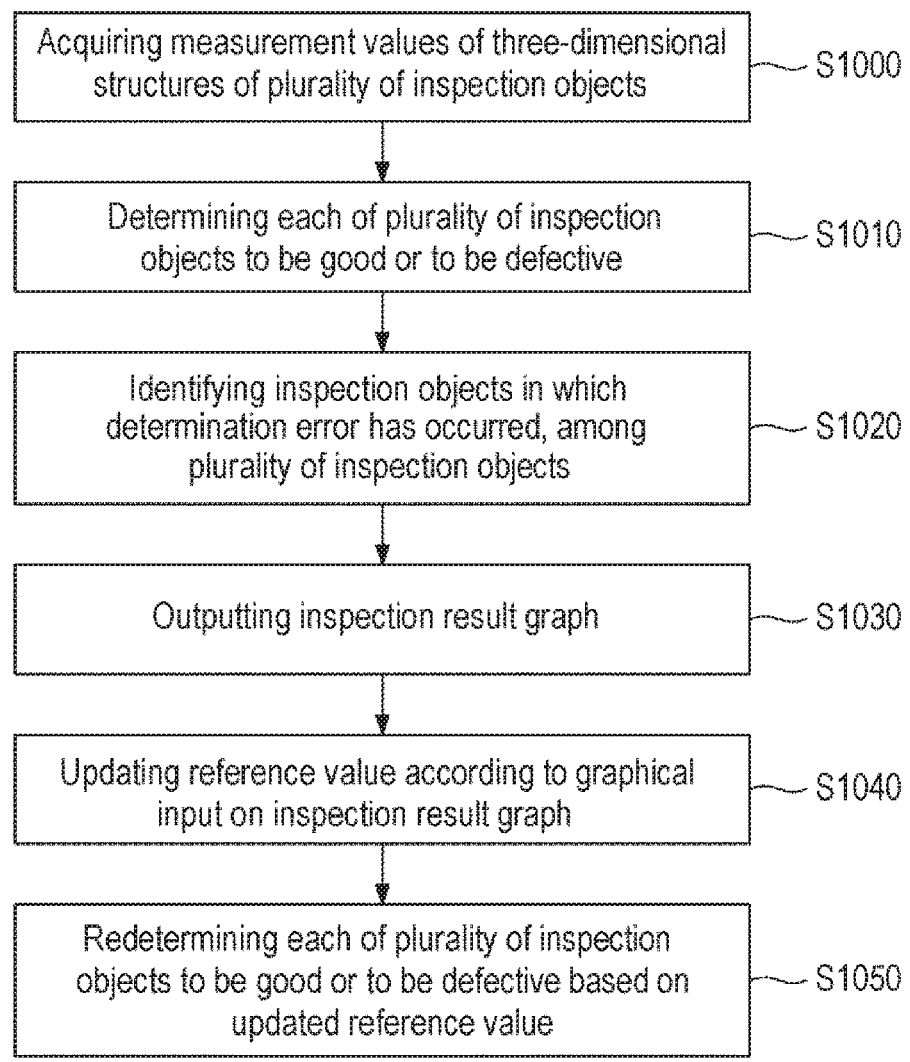

METHOD AND DEVICE FOR ADJUSTING QUALITY DETERMINATION CONDITIONS FOR TEST BODY

TECHNICAL FIELD

The present disclosure relates to a method and a device for adjusting a condition for determining a quality of an inspection object.

BACKGROUND

Manufacturers are making efforts to remove defective products during the production, assembly, intermediate process, and final assembly process. In such processes, manufacturers determine a quality of the product (that is, determine whether the product is good or defective (or no-good: NG) using various kinds of inspection systems.

According to an embodiment, an inspection system may measure the structure of an inspection object and determine whether or not measurement values fall within a predetermined range, thereby determining whether the corresponding inspection object is good or defective. For example, the inspection system irradiates light to an inspection object and receives light reflected from the inspection object, thereby acquiring image data of the inspection object. In addition, the inspection system acquires measurement values of the inspection object based on the acquired image data and outputs an inspection result which is a result of determination whether the inspection object is good or defective (NG) based on the measurement values and a predetermined reference value.

The inspection result obtained by the inspection system may comprise a determination error in which an inspection object, which is actually of good, is determined to be defective (False Call) or in which an inspection object, which is actually defective, is determined to be good (Escape). To remove such determination error, a reference value used for determining a quality of a product may be modified. However, existing inspection systems just display the measurement values of the inspection object in numbers on a display unit, and a user often inputs a reference value directly as well. Therefore, if the user desires to change the reference value, the user checks the measurement values displayed on the display unit, and directly inputs a new reference value every time.

SUMMARY

The present disclosure provides a method and a device for graphically displaying an inspection result for an inspection object and more conveniently adjusting a reference value used for determining a quality of a product.

In addition, the present disclosure provides a method and a device for visually displaying an inspection result of an inspection object, a determination result of a quality of a product, and a review result of the determination result.

In addition, the present disclosure provides a method and a device for visually displaying a change in a determination result of a quality of a product and a review result of the determination result, according to adjustment of a reference value.

Further, the present disclosure provides a method and a device enabling more intuitive and convenient user input for reducing a determination error of a quality of a product.

One aspect of the present disclosure provides a method for adjusting a condition for determining a quality of an inspection object in a quality determination device including a database, a processing unit, a user input unit, and an output unit. A method according to an exemplary embodiment may include: acquiring, by the processing unit, measurement values for structures of a plurality of inspection objects from the database, determining, by the processing unit, whether each of the plurality of inspection objects is good or defective by comparing error values of the measurement values with respect to design values of the structures with a predetermined reference value; identifying, by the processing unit, one or more inspection objects in which a determination error has occurred, among the plurality of inspection objects; generating, by the processing unit, an inspection result graph including the number of a plurality of inspection objects according to the error values, the reference value, and the number of the one or more inspection objects in which the determination error has occurred, and outputting the inspection result graph through the output unit; updating, by the processing unit, the reference value according to a graphical input on the inspection result graph through the user input unit such that the number of the one or more inspection objects in which the determination error occurred is reduced; and redetermining, by the processing unit, whether each of the plurality of inspection objects is good or defective by comparing the error values with the updated reference value. The determination error includes a first error in which the inspection object determined to be good is identified to be defective and a second error in which the inspection object determined to be defective is identified to be good.

According to at least one embodiment of the present disclosure, an inspection result of inspection objects and a reference value may be graphically displayed, and the displayed reference value may be adjusted by a graphical input of the user. In addition, the inspection result for the inspection objects may be updated based on a reset reference value, and an updated inspection result may be graphically displayed. As a result, the user may more efficiently and easily adjust the reference value used for a quality determination of the inspection objects.

According to at least one embodiment of the present disclosure, a graph indicating an inspection result of inspection objects, a result of the quality determination, and a review result of the quality determination may be output, which enables the user to enter an input to reduce the determination error on the output graph. In addition, a change in the review results of the quality determination according to user input may be visually indicated on the graph. As a result, the user may more easily and intuitively identify whether or not the determination error are reduced.

According to at least one embodiment of the present disclosure, in the case where the structure of the inspection object is measured and a quality determination is performed according to a reference value before updating, even if the reference value is updated according to user input, a quality redetermination of the inspection object using the updated reference value may be executed without measuring the structure of the inspection object again. As a result, the quality redetermination according to the update of the reference value may be executed quickly.

BRIEF DESCRIPTION OF DRAWINGS

FIG. 4 is a view illustrating an inspection result list including determination error according to an embodiment of the present disclosure.

FIG. 10 is a flowchart illustrating a method for adjusting a condition for determining a quality of inspection objects according to an embodiment of the present disclosure.

DETAILED DESCRIPTION

Figure 1:
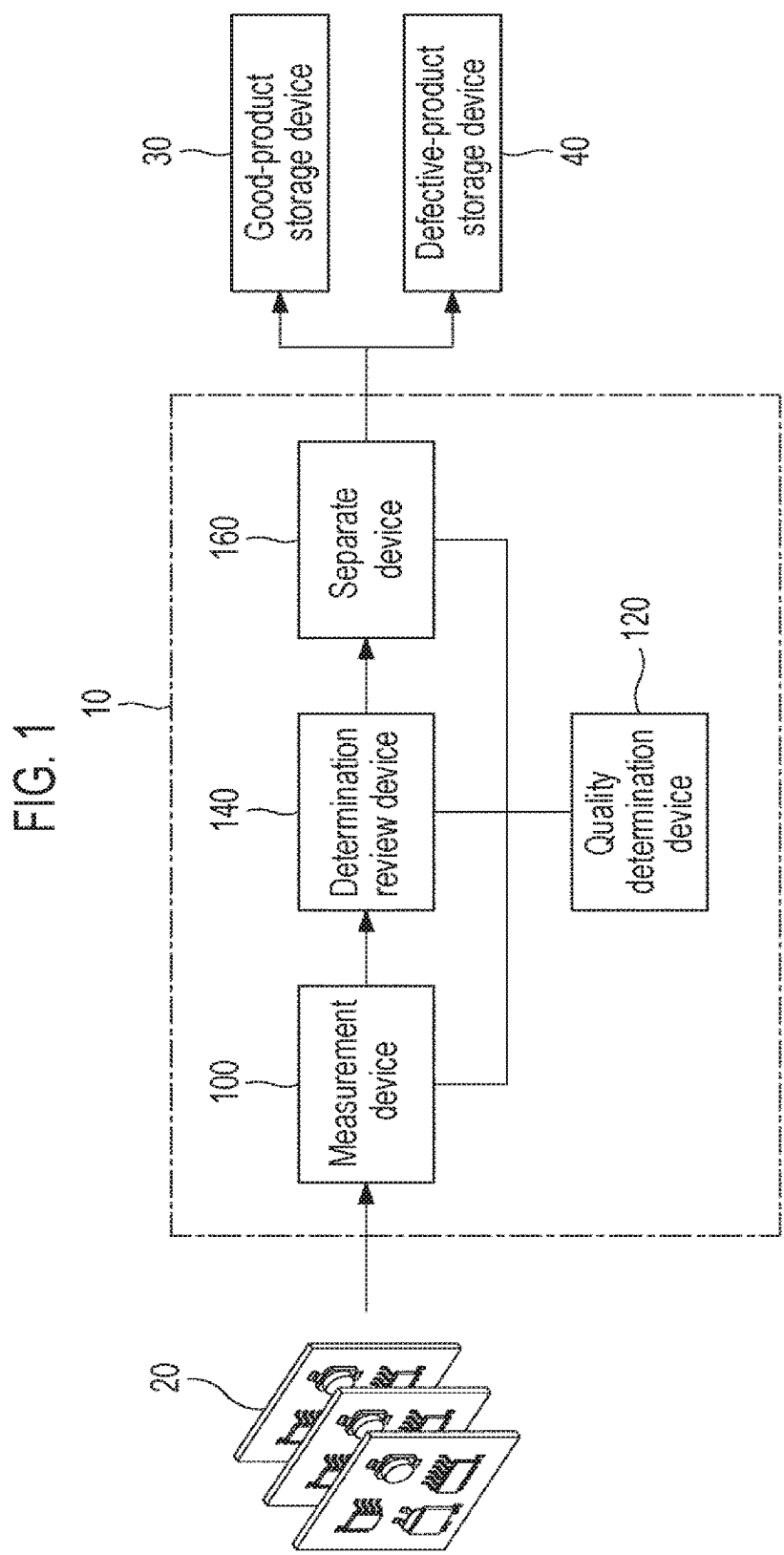
FIG. 1 is a view schematically illustrating an inspection system for determining an inspection object to be good or to be defective according to an embodiment of the present disclosure.

Embodiments of the present disclosure are illustrated for describing the present disclosure. Embodiments of the present disclosure may be performed in various forms, and the present disclosure should not be construed as being limited to the embodiments described below or to the detailed descriptions of the embodiments.

The term "unit" used herein means a software component or a hardware component, such as a field-programmable gate array (FPGA) and an application specific integrated circuit (ASIC). However, the "unit" is not limited to software and hardware. The "unit" may be configured to be provided in an addressable storage medium, or may be configured to run one or more processing units. Accordingly, for example, the "unit" may include components, such as software components, object-oriented software components, class components, and task components, as well as processing units, functions, attributes, procedures, subroutines, segments of program codes, drivers, firmware, micro-codes, circuits, data, databases, data structures, tables, arrays, and variables. Functions provided by the components and the "unit" may be combined into a smaller number of components, or may be further divided into additional components and "units."

All technical or scientific terms used herein have meanings that are generally understood by a person skilled in the art to which the present disclosure pertains, unless otherwise specified. The terms used herein are selected for the purpose of clarifying the subject matter of the present disclosure, and are not intended to limit the scope of the present disclosure.

A singular expression herein may include meanings of plurality, unless otherwise mentioned, and the same is applied to a singular expression stated in the claims.

The terms "first", "second", and the like used in various embodiments of the present disclosure are used to distinguish between a plurality of components, and are not intended to limit the order or importance of the relevant components.

The expressions "include", "have" and the like used herein should be understood as open-ended terms connoting the possibility of inclusion of other embodiments, unless otherwise mentioned in a phrase or sentence including the expressions.

The expression "based on" used herein is used to describe one or more factors that influences a decision, an action of determination, or an operation described in a phrase including the relevant expression, and this expression does not exclude additional factors influencing the decision, the action of determination, or the operation.

When a certain component is described as "coupled to" or "connected to" another component herein, it should be understood that the certain component may be directly coupled or connected to another component, or that the certain component may be coupled or connected to another component via a new intervening component.

Hereinafter, embodiments of the present disclosure will be described with reference to the accompanying drawings. In the drawings, like components are indicated by like reference numerals, and repeated descriptions of the same components will be omitted.

FIG. 1 is a view schematically illustrating an inspection system 10 for determining an inspection object to be good or to be defective according to an embodiment of the present disclosure.

The inspection system 10 according to an embodiment of the present disclosure may determine whether each of a plurality of inspection objects 20 is good or defective, and may separate the plurality of inspection objects to be transferred to a good-product storage device 30 or a defective-product storage device 40 according to the determination result. Here, the inspection object 20 may be any product having a three-dimensional structure manufactured according to predetermined design criteria. For example, the inspection object 20 may be a printed circuit board (PCB) on which electronic components are mounted.

The inspection system 10 may include a measurement device 100, a quality determination device 120, a determination review device 140, and a separate device 160. The inspection system 10 may also include a network 180 for connecting the measurement device 100, the quality determination device 120, the determination review device 140, and the separate device 160 to each other and performing communication therebetween. As illustrated in FIG. 1, the inspection object 20 may be transferred to the good-product storage device 30 or the defective-product storage device 40 through the measurement device 100, the determination review device 140, and the separate device 160 along a direction of an arrow.

According to an embodiment, the inspection system 10 may be installed at the end of a manufacturing stage for manufacturing the inspection object 20 or at the end of a processing stage for processing the inspection object 20. In this case, the inspection system 10 may determine whether the manufactured or processed inspection object 20 is manufactured according to predetermined design criteria. In addition, the inspection system 10 may transfer inspection objects 20 determined to be good to the good-product storage device 30, and may transfer inspection objects 20 determined to be defective to the defective-product storage device 40 according to a determination result.

The measurement device 100 may generate measurement values by measuring the structure (e.g., a three-dimensional structure) of the inspection object 20. According to an embodiment, the measurement device 100 may measure the structure of the inspection object 20 using light. For example, the measurement device 100 may irradiate a structured light to the inspection object 20, may receive light reflected from the inspection object 20, and may generate image data of the inspection object 20 based on the received light. In addition, the measurement device 100 may generate measurement values by measuring the structure of the inspection object 20 based on the image data. The measurement values generated by the measurement device 100 may be transmitted to the quality determination device 120 through the network 180. The configuration and operation of the measurement device 100 will be described in more detail with reference to FIG. 2.

The quality determination device 120 may determine whether the inspection object 20 is good or defective. The quality determination device 120 may determine whether the inspection object 20 is good or defective by determining whether or not the measurement value generated by the measurement device 100 fall within a predetermined range. According to an embodiment, the quality determination device 120 may calculate error values between design values and the measurement values of the structure of the inspection object 20. The quality determination device 120 may determine that the inspection object 20 having error values equal to or less than a predetermined reference value to be good, and may determine that the inspection object 20 having error values exceeding the predetermined reference value to be defective (NG).

According to an embodiment, the quality determination device 120 may determine some of the inspection objects 20 having error values equal to or less than the predetermined reference value (i.e., some of the inspection objects 20 determined to be good) to be "warning". For example, if the error values of the inspection object 20 fall within a predetermined range close to the predetermined reference value, the quality determination device 120 may determine the corresponding inspection object 20 to be "warning".

The determination review device 140 may determine whether or not there is an error in the quality determination of the inspection object 20 performed by the quality determination device 120. For example, the inspection object 20 determined to be good by the quality determination device 120 may actually be defective (Escape). In addition, the inspection object determined to be defective by the quality determination device 120 may actually be good (False Call). Such a determination error may occur in the quality determination device 120 when the reference value used for quality determination is not properly set. For example, if a predetermined reference value to be compared with the error values is set to be high, the quality determination device 120 may determine an inspection object 20, which is actually defective, to be good, and the determination review device 140 may determine that an error has occurred in the determination of the inspection object 20 which is actually defective, and is determined to be good. In addition, if a predetermined reference value to be compared with the error values is set to be low, the quality determination device 120 may determine an inspection object 20, which is actually good, to be defective, and the determination review device 140 may determine that an error has occurred in the determination of the inspection object 20 which is actually good and is determined to be defective.

The determination review device 140 may be implemented using a device determining whether or not the quality of the inspection object 20 is actually good or defective. For example, the determination review device 140 may include a device more accurately measuring the structure of the inspection object 20. As another example, the determination review device 140 may include a device checking an electrical characteristics of the inspection object 20.

According to an embodiment, the determination review device 140 may determine whether or not there is a determination error in some of the inspection objects 20 that are determined to be good or to be defective by quality determination device 120. For example, the determination review device 140 may determine whether or not there is a determination error in the inspection object 20 that is determined to be "warning" or "defective" by the quality determination device 120. In this case, the efficiency may be improved as compared to the case of determining the determination error in all inspection objects.

According to another embodiment, the determination review device 140 may also determine whether or not there are determination error in all inspection objects 20 that is determined to be good or defective by the quality determination device 120. In this case, accuracy may be improved compared to the case of determining the determination error of some inspection objects. A review result of the determination review device 140 may be transmitted to the quality determination device 120 through the network 180.

According to another embodiment, the determination review device 140, based on a distribution of the measured error values, may estimate a range of good error values of inspection objects 20 determined to be good, and may further estimate a range of defective error values inspection objects 20 determined to be defective.

Error values of the physical properties of products produced according to a specific manufacturing process may have a constant probability distribution. The error values of inspection objects 20, which are produced through a given process and are determined to be good, may have a distribution of good error values, which is, for example, expressed as a Gamma distribution curve. The error values of inspection objects 20 which are determined to be defective due to problems other than the process may have a distribution of defective error values, which is, for example, expressed as a Normal distribution curve.

Using the above, the determination review device 140 may determine at least one probability distribution curve that most closely fits the distribution of the measured error values, may regard a probability distribution curve that is closest to the origin, among the determined probability distribution curves, as the distribution of the good error values, and may regard the remaining probability distribution curves (if any) as the distribution of the defective error values.

Meanwhile, vertical axes of graphs of a distribution curve of the good error values and a distribution curve of the defective error values denote the number of inspection object samples, which is a natural number. Thus, it may be possible to consider that one or more inspection object samples exist stochastically only in a range of the horizontal axis in which the vertical axis value of the graph is 1 or more and that if a value is out of the range of the horizontal axis above, an inspection object sample of less than 1 exists (i.e., no inspection object sample exists). In some cases, the user may consider only the range of error values in which the number of inspection object samples is a predetermined number or more as a meaningful range of the error values. In some cases, the user may consider only the range of error values, which includes the inspection object samples of a predetermined percentage of the inspected inspection object samples (e.g., the inspection object samples of 99.5% in order from the smallest error value to the largest error value), as a meaningful range of the error values.

According to these observations, a range of good error values or a range of defective error values, which is considered to be meaningful by the user, may be estimated from the distribution curve of the good error values or the distribution curve of the defective error values. The meaningful distribution of the defective error values may not be obtained depending on the situation, and thus the meaningful range of defective error values may not be estimated.

More specifically, the determination review device 140 may estimate a distribution of the good error values using a predetermined probability distribution function from the distribution of a given sample error values, and may further estimate a distribution of the defective error values as necessary. In this case, the determination review device 140 may estimate a range of good error values in which one or more samples exist from the distribution of the good error values, and may estimate a range of the defective error values in which one or more samples exist from the distribution of the defective error values (if any).

If the estimated range of the good error values and range of the defective error values partially overlap each other, the determination review device 140 may re-estimate a reduced range of the good error values and a reduced range of the defective error values, respectively, in consideration of the area where the distribution of the good error values and the distribution of the defective error values overlap each other.

If two or more distributions of the defective error values are estimated, the determination review device 140 may re-estimate an integrated range of the defective error value encompassing ranges of the defective error values, which are estimated from the respective distributions of the defective error values.

The determination review device 140 may determine whether or not there is an error in the quality determination of the inspection object 20 performed by the quality determination device 120 based on the estimated range of the good error values and further based on (if any) the estimated range of the defective error values.

For example, if the reference value of quality determination falls within the range of the good error values, and if an error value of a certain inspection object 20 is greater than the reference value but is within the range of the good error values, the determination review device 140 may determine that there is a second type of error (false call) in which the inspection object which is determined to be defective due to the reference value but is actually good, and may determine that the current reference value is too strict.

For example, if the reference value of quality determination falls within or exceeds the range of the defective error values, and if an error value of a certain inspection object 20 is less than the reference value but is within the range of the defective error values, the determination review device 140 may determine that there is a first type of error (escape) in which the inspection object 20 which is determined to be good due to the reference value but is actually defective, and may determine that the reference value is too loose.

Accordingly, the determination review device 140 may determine the number of inspection objects in which a determination error has occurred by means of the number of inspection objects 20 having error values, which are within the range of the good error values and greater than a reference value, in the case where the reference value of quality determination falls within the range of the good error values or by means of the number of inspection objects having error values, which are within the range of the defective error values and less than a reference value, in the case where the reference value of quality determination falls within the range of defective error values or exceeds the same.

The determination result of the determination review device 140 may be transmitted to the quality determination device 120 through the network 180. In addition, the distribution of the good error values and the range of the good error values, which are estimated by the determination review device 140, may also be transmitted to the quality determination device 120 via the network 180. Additionally, the distribution of the defective error values and the range of the defective error values, which are estimated by the determination review device 140, may also be transmitted to the quality determination device 120 through the network 180.

As described above, the determination review device 140 may identify inspection objects that are strongly expected to have the determination error from the distributions of error values detected in the samples in the early stages of production even though the samples determined to be defective are not actually re-inspected accurately, and may further determine an appropriateness of the current reference value.

The quality determination device 120 according to an embodiment of the present disclosure may adjust the condition for determining the quality of the inspection object 20 such that the number of inspection objects 20 determined to have determination error by the determination review device 140 is reduced. The quality determination device 120 may update the reference value to be compared with the error values based on the results of the quality determination of the inspection object 20 generated by the quality determination device 120 and the result of the determination review of the inspection object 20 generated by the determination review device 140. For example, if the determination review device 140 determines that determination error (False call) has occurred in at least a part of inspection objects 20, the quality determination device 120 may increase the reference value to be compared with the error values. In addition, if it is determined by the determination review device 140 that determination error (Escape) has occurred in at least a part of inspection objects 20, the quality determination device 120 may reduce the reference value to be compared with the error values.

The quality determination device 120 may update the reference value to be compared with the error values according to user input. The quality determination device 120 may graphically display the result of the quality determination, the result of the determination review, and the reference value for inspection objects 20. The user may provide a graphical input to the quality determination device 120 to adjust the reference value such that the number of inspection objects in which the determination error has occurred is reduced based on the graphically displayed result of the quality determination and the result of the determination review. The quality determination device 120 may update the reference value in response to the graphical input of the user.

The quality determination device 120 may compare the updated reference value with the error values, thereby redetermining whether or not the quality of the inspection object 20 is good or defective. In addition, the quality determination device 120 may identify whether or not there in an error in the redetermination result of the inspection object 20 based on the result of the determination review generated by the determination review device 140, which indicate whether the inspection object 20 is actually good or defective. Accordingly, the quality determination device 120 may graphically display the result or the quality redetermination of the inspection objects 20, the updated reference value, and the number of inspection objects in which the redetermination error has occurred.

The quality determination device 120 may be implemented using a computing device, such as, a server computer, a personal computer, a laptop computer, a smart phone, or a tablet PC. The configuration and operation of the quality determination device 120 will be described in more detail with reference to FIGS. 3 to 10.

The separate device 160 may separate the inspection objects 20 to be transferred to the good-product storage device 30 or the defective-product storage device 40. The separate device 160 may transfer inspection objects 20 determined to be good and inspection objects 20 determined to be defective to the good-product storage device 30 and the defective-product storage device 40, respectively, based on the redetermination results by the quality determination device 120.

The network 180 enables connections and communications between the measurement device 100, the quality determination device 120, the determination review device 140, and the separate device 160. The network 180 may be implemented using a wired network, such as a local area network (LAN), a wide area network (WAN), a value added network (VAN), or the like, or using a wireless network, such as a mobile radio communication network, a satellite communication network, Bluetooth, the wireless broadband Internet (Wibro), high-speed downlink packet access (HSDPA), or the like.

Although the respective devices of the inspection system 10 are illustrated as separate configurations in FIG. 1, the present disclosure is not limited thereto, and at least some of the configurations of any one of the quality determination device 120, the determination review device 140, and the separate device 160 may be integrated into other devices. According to an embodiment, at least some configurations of the determination review device 140 may be integrated into the quality determination device 120. For example, the configuration of the determination review device 140 for determining an error of the quality determination through estimation from a distribution of error values may be implemented as the quality determination device 120.

Figure 2:
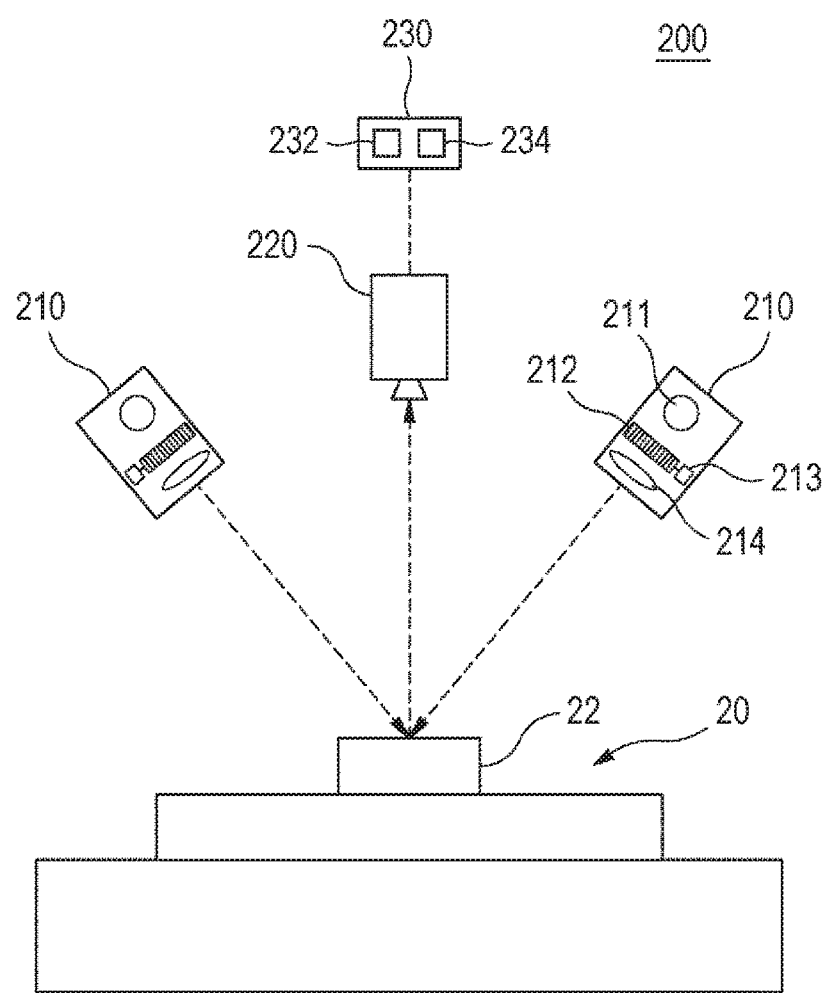
FIG. 2 is a view schematically illustrating the configuration of a measurement device for measuring a structure of an inspection object according to an embodiment of the present disclosure.

FIG. 2 is a view schematically illustrating the configuration of a measurement device 200 for measuring a structure of an inspection object according to an embodiment of the present disclosure. According to a plurality of embodiments, the measurement device 200 in FIG. 2 may include all the technical features of the measurement device 100 in FIG. 1. As illustrated in FIG. 2, the measurement device 200 includes an illumination unit 210, a imaging unit 220, and an image processing unit 230.

The illumination unit 210 irradiates pattern light to the inspection target 22, which is a part of the inspection object 20, in order to measure the inspection target 22. For example, the inspection object 20 is a printed circuit board, and the inspection target 22 is a solder formed on the printed circuit board or an electronic part mounted on the printed circuit board. However, the inspection object 20 and the inspection target 22 according to the present disclosure are not limited thereto, and may be any of products having a three-dimensional structure.

In an embodiment, the illumination unit 210 includes a light source 211 for emitting light, a grating element 212 for converting light from the light source 211 into the pattern light, a grating-transferring mechanism 213 for transferring the grating element 212 by a pitch, and a projection lens 214 for projecting the pattern light converted by the grating element 212 to the inspection target 22. For example, the grating element 212 may be transferred by a predetermined distance (e.g., $2\pi/N$, where N is a natural number of 2 or more) using the grating-transferring mechanism 213, such as a piezo (PZT) actuator, for phase shift of the pattern light.

As illustrated in FIG. 2, two illumination units 210 may be provided. However, the illumination unit 210 according to the present disclosure is not limited thereto, and one illumination unit 210 or three or more illumination units 210 may be provided. If two or more illumination units 210 are provided, a plurality of illumination units 210 may be arranged to be spaced at a predetermined angle apart from each other along a circumferential direction or a virtual polygonal plane, or may be arranged to be spaced a constant distance apart from each other along the direction perpendicular to the inspection object 20.

The imaging unit 220 may receive the light reflected by the inspection target 22, thereby acquiring image data of the inspection target 22. The imaging unit 220 may be implemented using a CCD (charge coupled device) camera or a CMOS (complementary metal oxide semiconductor) camera, but it is not limited thereto. The imaging unit 220 may be provided above the inspection object 20 in the vertical direction.

The image processing unit 230 processes the image data acquired by the imaging unit 220, thereby generating measurement values of the structure of the inspection target 22. For example, the image processing unit 230 measures the width, length, height, area, volume, etc. of the inspection target 22 from the image data of the inspection target 22. The measurement values generated by the image processing unit 230 may be stored in the storage 232 of the image processing unit 230, or may be transmitted to the quality determination device 120 by the communication unit 234.

Figure 3:
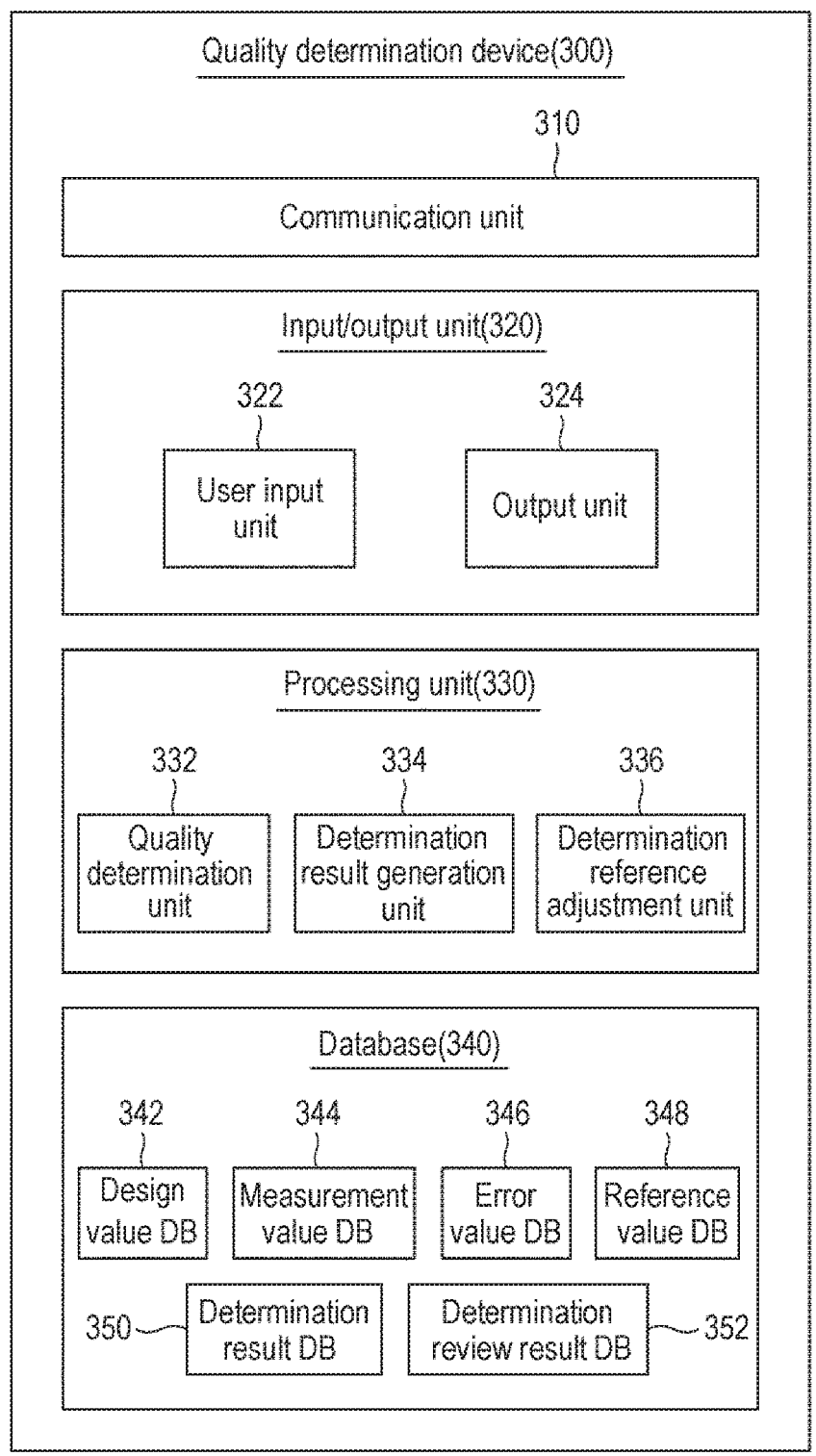
FIG. 3 is a block diagram illustrating the detailed configuration of a quality determination device for determining whether the an inspection object is good or defective according to an embodiment of the present disclosure.

FIG. 3 is a block diagram illustrating the detailed configuration of a quality determination device 300 for determining whether the an inspection object is good or defective according to an embodiment of the present disclosure. According to a plurality of embodiments, the quality determination device 300 in FIG. 3 may include all the technical features of the quality determination device 160 in FIG. 1. As illustrated in FIG. 3, the quality determination device 300 according to an embodiment of the present disclosure includes a communication unit 310, an input/output unit 320, a processing unit 330, and a database 340.

The communication unit 310 may communicate with other devices, such as the measurement device 100, the determination review device 140, and the separate device 160 in FIG. 1. In the communication unit 310, subcomponents for communication with the above devices may be integrated into a single hardware device.

The input/output unit 320, which interfaces with a user, includes a user input unit 322 and an output unit 324. The user input unit 322 may receive inputs in relation to quality determination from the user. For example, the user input unit 322 may receive an input for adjusting the reference value used for quality determination, an input for displaying the result of the quality determination, an input for selecting one of the result of the quality determination, and the like. The user input unit 322 may include a keyboard, a mouse, a touchpad, a touch screen, and the like.

The output unit 324 provides the user with outputs related to the quality determination. For example, the output unit 324 may display the result of the quality determination of the inspection objects 20, the reference value used for quality determination, and the like. The output unit 324 may include a liquid crystal display (LCD), a light-emitting diode (LED) display, an organic light-emitting diode (OLED) display, and the like.

The processing unit 330 may process data related to the quality determination. The processing unit 330 includes a quality determination unit 332, a determination result generation unit 334, and a determination reference adjustment unit 336. In addition, the database 340, which stores data related to the quality determination, includes a design value DB 342, a measurement value DB 344, an error value DB 346, a reference value DB 348, a determination result DB 350, and a determination review result DB 352.

The design value DB 342 stores design values for all the inspection targets 22 of the inspection object 20. For example, if the inspection object 20 is a PCB, the width and length of a pad provided on the PCB, the volume and area of a solder placed on the pad, the height from an electronic component placed on the solder to the pad, and the like may be stored as design values in the design value DB 342.

The measurement value DB 344 stores measurement values for all the inspection targets 22 of the inspection object 20. The measurement values stored in the measurement value DB 344 may correspond to the design values stored in the design value DB 342. According to an embodiment, the measurement values of the inspection object 20 may be generated by the measurement device 200 in FIG. 2. The measurement values generated by the measurement device 200 may be stored in the measurement value DB 344 through the communication unit 234 of the measurement device 200 and the communication unit 310 of the quality determination device 300.

The quality determination unit 332 may calculate error values of the measurement values with respect to the design values of the inspection target 22 of the inspection object 20. The quality determination unit 332 calculates, as an error value, the difference between the design value of the inspection target 22 of the inspection object 20, which is stored in the design value DB 342, and the measurement value of the inspection target 22 of the inspection object 20, which is stored in the measurement value DB 344. The calculated error values may be stored in the error value DB 346.

The quality determination unit 332 may determine whether or not the structure of the inspection object 20 satisfies a predetermined criterion. The quality determination unit 332 may compare error values stored in the error value DB 346 with a reference value stored in the reference value DB 348, thereby determining whether or not the inspection object 20 is good or defective. According to an embodiment, the quality determination unit 332 may determine that the inspection object 20 is good if an error value for the inspection target 22 of the inspection object 20 is equal to or less than a reference value for the corresponding inspection target 20, and may determine that the inspection object 20 is defective if the error value exceeds the reference value. For example, if the reference value for the length of a pad of the inspection object 20 is set to 0.5 mm, the quality determination unit 332 determines inspection object 20 having an error value of 0.6 mm for the length of the pad to be defective and determines inspection object 20 having an error value of 0.4 mm to be good. The quality determination results generated by the quality determination unit 332 may be stored in the determination result DB 350.

The determination review result DB 352 stores the result of the determination review indicating whether or not there is an error in the quality determination of the quality determination unit 332 for the inspection target 22 of the inspection object 20. If an error occurs in the quality determination for the inspection target 22, "determination error" may be displayed as the result of the determination review for the corresponding inspection target 22. The determination error comprises a first type of error (Escape) in which the inspection target 22 determined to be good by the quality determination unit 332 is actually defective and a second type of error (False Call) in which the inspection target 22 determined to be defective by the quality determination unit 332 is actually good.

According to an embodiment, the determination review results stored in the determination review result DB 352 may be generated by the determination review device 140 in FIG. 1. The communication unit 310 may receive the determination review results generated by the determination review device 140, and may store the same in the determination review result DB 352. In addition, the distribution of the good error values, the range of the good error values, the distribution of the defective error values (if any), and the range of the defective error values (If any), which are estimated by the determination review device 140, may be stored in the determination review result DB 352 through the communication unit 310 of the quality determination device 300.

The determination result generation unit 334 may generate an inspection result graph indicating the number of inspection objects depending on error values. According to an embodiment, the inspection result graph may be a two-dimensional graph, wherein the horizontal axis indicates error values and the vertical axis indicates the number of inspection objects 20 having corresponding error values. In addition, the determination result generation unit 334 may display a GUI (graphical user interface) object, which is movable by manipulation of the user, as a reference value on the inspection result graph. For example, the GUI object indicating the reference value may have a shape such as a bar, an arrow, a line, a point, a square, or the like.

The determination result generation unit 334 may display the result of the quality determination of the inspection objects 20 on the inspection result graph. According to an embodiment, the determination result generation unit 334 may display "good", "warning", and "defective" as the result of the quality determination on the inspection result graph. For example, the determination result generation unit 334 may display the area where error values are equal to or less than a reference value as "good" on the inspection result graph, and may display the area where error values exceed the reference value as "defective" on the inspection result graph. In addition, the determination result generation unit 334 may display a predetermined area where error values are close to the reference value as "warning" on the inspection result graph. In this case, the boundary of the area corresponding to "warning" may be displayed on the inspection result graph. In addition, according to an embodiment, the determination result generation unit 334 may display the number of inspection objects 20 corresponding to "good", "warning", and "defective", respectively, on the inspection result graph.

The determination result generation unit 334 may display the review result for the result of the quality determination on the inspection result graph. According to an embodiment, the determination result generation unit 334 may display, as the result of the determination review, a first type of error (Escape) and a second type of error (False Call) on the inspection result graph. For example, the determination result generation unit 334 displays the area including the inspection objects 20 that are actually determined to be good, among the areas where the error values exceed the reference value on the inspection result graph, as the first type of error (Escape). In addition, the determination result generation unit 334 displays the area including the inspection objects 20 that are actually determined to be defective, among the areas where the error values equal to or less than the reference value on the inspection result graph, as the second type of error (False Call).

According to an embodiment, determination error, such as the first type of error and the second type of error, may be determined through accurate inspection by the determination review device 140. The determination review device 140 may include a device more accurately measuring the structure of the inspection object 20 or a device measuring the electrical characteristics of the inspection object 20. The determination review device 140 may more accurately measure the structural and electrical characteristics of the inspection object 20, thereby determining whether or not the inspection object 20 are actually good or defective. As a result, the determination review device 140 may identify the inspection objects 20 that are actually defective from among the inspection objects 20 determined to be good, and may identify the inspection objects 20 that are actually good from among the inspection objects 20 determined to be defective.

According to another embodiment, the determination error may be determined through estimation from the distribution of error values by the determination review device 140. The determination review device 140 may determine one or more probability distribution curves fitting to the distribution of the error values of the inspection object 20, which is measured by the measurement device 100, may regard the probability distribution curve closest to the origin, among the determined probability distribution curves, as a distribution of the good error values, and may regard the remaining probability distribution curves (if any) as a distribution of the defective error values. The determination review device 140 may estimate the range of the good error values from the distribution of the good error values, and may estimate the range of the defective error values from the distribution of the defective error values (if any). In addition, the determination review device 140 may determine the inspection objects 20 in which determination error has occurred, among the inspection objects 20, based on the range of the good error values and the range of the defective error values (if any).

According to the above-described embodiment, the determination review device 140 may determine an error of the quality determination through estimation from the distribution of the error values, and the determination result generation unit 334 may identify the inspection objects in which determination error has occurred based on the error of the quality determination determined by the determination review device 140, but the present disclosure is not limited thereto. For example, the determination result generation unit 334 may directly determine the error of the quality determination through estimation from the distribution of the error values, and may identify the inspection objects 20 in which determination error has occurred.

According to an embodiment, the determination result generation unit 334 may determine candidate reference value so as to update the reference value. The determination result generation unit 334 may determine at least one candidate reference value such that the number of inspection objects 20 in which determination error has occurred is reduced or minimized. For example, the determination result generation unit 334 may determine the candidate reference value such that the area corresponding to the first type of error (Escape) or the second type of error (False Call) is reduced or eliminated by replacing the reference value with the candidate reference value. The determination result generation unit 334 may display one or more determined at least one candidate reference value on the inspection result graph. For example, the at least one candidate reference value may be represented by points, lines, rectangles, arrows, and the like.

According to an embodiment, the determination result generation unit 334 may determine the at least one candidate reference value based on the range of the good error value and the range of the defective error values (if any) of the inspection objects 20, which are estimated by the determination review device 140. If the range of the defective error values is provided, the determination result generation unit 334 is may determine the candidate reference value from among values equal to or greater than the maximum value of the range of the good error values and equal to or less than the minimum value of the range of the defective error values. If no the range of the defective error values is provided, the determination result generation unit 334 may determine the candidate reference value from among values equal to or greater than the maximum value of the range of the good error values.

According to an embodiment, the user may select a predetermined area on the inspection result graph through the user input unit 322. The determination result generation unit 334, in response to a user input received through the user input unit 322, may enlarge the selected predetermined area, and may output the enlarged predetermined area through the output unit 324. For example, the enlarged predetermined area may be output so as to overlap the inspection result graph.

According to an embodiment, the determination result generation unit 334 may generate an inspection result list 333 that includes at least one of measurement values, error values, a result of the quality determination, and a result of determination error review for the inspection objects 20. The determination result generation unit 334 may output the inspection result graph and the inspection result list through the output unit 324. The user may identify the inspection result graph and inspection result list through the output unit 324.

According to an embodiment, the user may select any one of the inspection objects 20 from the inspection result list through the user input unit 322. In response to the user input received through the user input unit 322, the determination result generation unit 334 may display the error values of the selected inspection object 20 on the inspection result graph. For example, the error values of the selected inspection object 20 may be displayed in the form of a point, line, square, arrow, and the like. According to another embodiment, if no input for selecting the inspection object 20 is received from the user, an inspection object 20 that has most recently been determined to be good or to be defective may be automatically selected. In this case, the error values of the inspection object 20 that has most recently been determined to be good or to be defective may be displayed on the inspection result graph.

The determination reference adjustment unit 336 may update the reference value according to an input received from the user through the user input unit 322. According to an embodiment, the determination reference adjustment unit 336 may receive, from the user, a graphical input for moving the location of a GUI object indicating the reference value on the inspection result graph. For example, the user may click on a movable bar-shaped GUI object indicating the reference value using a mouse as the user input unit 332, and may drag the same to a predetermined position on the inspection result graph. In this case, the determination reference adjustment unit 336, in response to the graphical input above, may update the reference value with a value corresponding to the dragged position. According to another embodiment, the determination reference adjustment unit 336 may receive, from the user, a graphical input for designating a specific position on the inspection result graph. For example, the user may click on a specific position on the inspection result graph using a mouse as the user input unit 322. In this case, the determination reference adjustment unit 336 may update the reference value with a value corresponding to the clicked position in response to the graphical input above. The updated reference value may be stored in the reference value DB 348 by the determination reference adjustment unit 336.

The quality determination unit 332 may redetermine inspection objects 20 to be good or to be defective based on the reference value updated by the determination reference adjustment unit 336. According to an embodiment, if the error values for the inspection target 22 of the inspection object 20 is equal to or less than the updated reference value, the quality determination unit 332 may redetermine that the inspection object 20 is good, and if the error value exceeds the updated reference value, the quality determination unit 332 may determine that the inspection object 20 is defective.

In addition, the quality determination unit 332 may identify the inspection object 20, among the inspection objects 20, in which redetermination error has occurred. According to an embodiment, the quality determination unit 332 may identify the inspection objects 20 in which redetermination error has occurred based on redetermination results of the inspection objects 20 and the result of the determination reviews stored in the determination review result DB 352. For example, the quality determination unit 332 may determine that a first type of error (Escape) has occurred in the inspection object 20 that was redetermined to be good despite the fact that it is actually defective, and may determine that a second type of error (False Call) has occurred in the inspection object 20 that was redetermined to be defective despite the fact that it is actually good.

The determination result generation unit 334 may display, on the inspection result graph, the reference value updated by the determination reference adjustment unit 336, the result of the quality redetermination using the updated reference value, and the result of the determination review for the result of the quality redetermination. The user may identify the inspection result graph output through the output unit 324, thereby confirming that the errors occurring in the quality redetermination using the updated reference value are reduced compared with the errors occurring in the quality determination using the reference value that is not updated.

As described above, the quality determination device 300 according to a plurality of embodiments of the present disclosure may graphically indicate the result of the quality determination and a reference value for the inspection objects, and may adjust the reference value according to a graphical input of the user. In addition, the quality determination device 300 may perform quality redetermination for the inspection object based on the reset reference value, may check whether or not there is an error in the quality redetermination, and may graphically indicate the result of the quality redetermination and the result of the determination review thereof. As a result, the user may more efficiently and easily adjust the reference value used for quality determination of inspection object.

FIG. 4 is a view illustrating an inspection result list 400 including determination error according to an embodiment of the present disclosure. According to a plurality of embodiments, the inspection result list 400 in FIG. 4 may be generated by the determination result generation unit 334 in FIG. 3, and may be output through the output unit 324.

As illustrated in FIG. 4, the inspection result list 400 includes inspection result data 410, 420, 430, 440, 450, and 460 for each of a plurality of inspection objects. Each of the inspection result data 410, 420, 430, 440, 450, and 460 includes an ID of a corresponding inspection object, an inspection object ID, an inspection target, a measurement target, a measurement value, an error value, a result of a quality determination, and a result of a determination review.

The inspection result data 410, 430 and 450 comprise measurement values obtained by measuring the width of "Pad 1" formed on the inspection object and error values obtained by differences between the measurement values and a design value of 10.0 mm. It is assumed that a reference value used for quality determination of the width of "Pad 1" is set to 0.5 mm. Referring to the inspection result data 410, the inspection object of ID "1" is determined to be good because the error value thereof is less than 0.5 mm. On the other hand, referring to the inspection result data 430 and 450, the inspection object of ID "2" and the inspection object of ID "459" are determined to be defective because error values thereof exceed 0.5 mm. Among the inspection objects above, the inspection object of ID "459" is determined to have the second type of error (False Call) as a result of quality determination review. For example, the width of "Pad 1" in the inspection object of ID "459" is determined to be defective according to a predetermined determination criterion, but is actually good.

The inspection result data 420, 440, and 460 include measurement values obtained by measuring the length of "Pad 1" provided on the inspection object and error values obtained by differences between the measurement values and a design value of 10.0 mm. It is assumed that a reference value used for quality determination of the length of "Pad 1" is set to 0.5 mm. Referring to the inspection result data 410, the inspection objects of ID "1", "2", and "459" are determined to be good because the error values thereof are less than 0.5 mm. Among the inspection objects above, the inspection object of ID "459" is determined to have the first type of error (Escape) as a result of quality determination review. For example, the length of "Pad 1" in the inspection object of ID "459" is determined to be good according to a predetermined determination criterion, but is actually defective.

Figure 5:
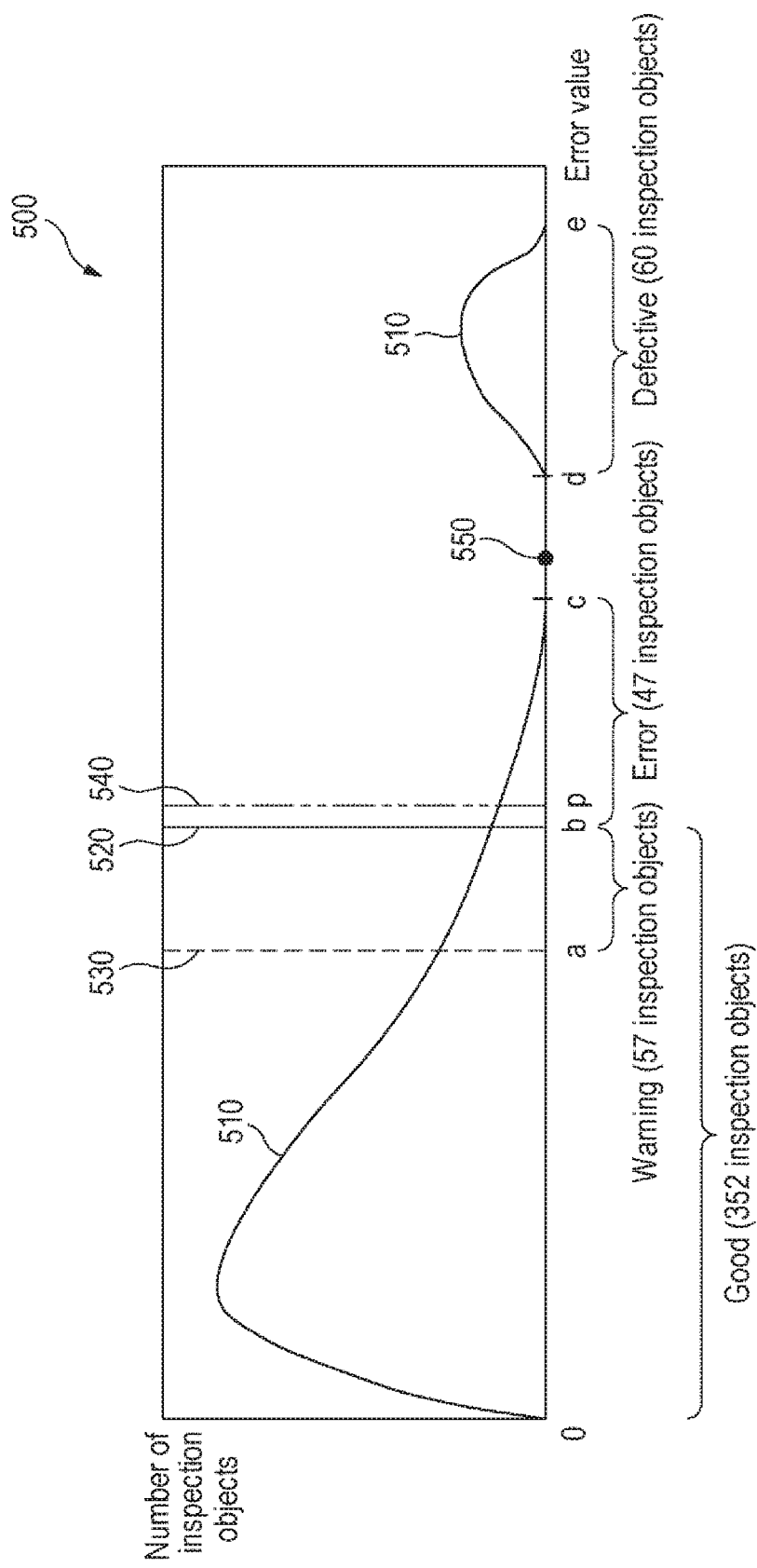
FIG. 5 is a view illustrating an inspection result graph indicating a result of a quality determination and a review result of the quality determination according to an embodiment of the present disclosure.

FIG. 5 is a view illustrating an inspection result graph indicating a result of a quality determination and a review result of the quality determination according to an embodiment of the present disclosure. According to a plurality of embodiments, the inspection result graph 500 in FIG. 5 may be generated by the determination result generation unit 334, and may be output through the output unit 324 in FIG. 3. According to an embodiment, the inspection result graph 500 in FIG. 5 may be generated in response to reception of an input for selecting any one of inspection result data (e.g., the inspection result data 450) from the inspection result list 400 in FIG. 4 through the user input unit 322.

As illustrated in FIG. 5, the horizontal axis of the inspection result graph 500 indicates error values, and the vertical axis thereof indicates the number of inspection objects. The inspection result graph 500 includes a curve 510 indicating the number of inspection objects having corresponding error values. In addition, the inspection result graph 500 may include a first reference value GUI 520 indicating a first reference value used for quality determination of the inspection objects and a second reference value GUI 530 indicating a second reference value used for determining the inspection objects corresponding to "warning", among the inspection objects determined to be "good". For example, the second reference value may be set to 90% of the first reference value.

In addition, the inspection result graph 500 may include a sample error value indicator 540 that indicates an error value "p" of any specific inspection object, such as an inspection object in which the user is particularly interested, among the inspection objects. For example, the sample error value indicator 540 may indicate the error value of the inspection object selected from the inspection result list 400 in FIG. 4. As another example, the sample error value indicator 540 may indicate the error value of the most recently inspected inspection object, among the inspection objects.

The result of the quality determination and the result of the determination review may be displayed on the inspection result graph 500. The areas corresponding to "good", "warning", and "error", respectively, as the result of the quality determination and the area corresponding to "defective" as the result of the determination review may be displayed on the inspection result graph 500. In addition, the number of inspection objects corresponding to "good", "warning", "error", and "defective", respectively, may be displayed on the inspection result graph 500. As illustrated in FIG. 5, 352 inspection objects having error values equal to or less than a first reference value "b" are determined to be "good", and 107 inspection objects having error values exceeding the first reference value "b" are determined to be "defective". In particular, although 57 inspection objects having error values between a second reference value "a" and the first reference value "b", among the 352 inspection objects determined to be good, are determined to be "good", they are classified into "warning" because the error values thereof are close to the first reference value. Meanwhile, since 60 inspection objects having error values between a value "d" and a value "e" are out of a natural error distribution pattern of a given process, it may be possible to determine that defects have occurred due to some problems other than the given process. However, the error distribution of the 47 inspection objects having error values between the first reference value "b" and the value "c" is consistent with the natural error distribution of the 352 inspection objects determined to be good, so that 47 inspection objects having error values between the value "b" and the value "c", which have been determined to be "defective", may be normal results of the given process, and may be actually good. Thus, the 47 inspection objects between the first reference value "b" and the value "c" may be determined to have the second type of error (false call). In order to verify whether or not such a determination corresponds the second type of error, the user may select and examine a specific inspection object having an error value "p" between the first reference value "b" and the value "c".

Although problems in the process, which cause the abnormal error values between the value "d" and the value "e", are solved, if the first reference value is maintained to be the value "b", the error values will be naturally distributed between zero and the value "c" in the normal process. Thus, if products continue to be produced using the process, a significant number of products produced subsequently will continue to have the error values between the first reference value "b" and the value "c", and will be determined to be "defective". That is, in the example illustrated in FIG. 5, if the production process itself is not erroneous, the first reference value for determining to be good and to be defective may be regarded as being set to be too strict without reflecting the characteristics of the natural error distribution in the production process.

The inspection result graph 500 may include a candidate reference value indicator 550 indicating a candidate reference value to minimize the number of inspection objects in which determination error has occurred. The candidate reference value may be a candidate for a reference value, which minimizes the number of inspection objects (e.g., 0) determined to be error, and may be selected from the range of error values between the value "c" and the value "d". Although the candidate reference value indicator 550 is denoted by a dot in FIG. 5, it is not limited thereto, and the candidate reference value indicator 550 may be displayed in any of various forms such as an arrow, a line, and a square. In addition, although a single candidate reference value indicator 550 is displayed in FIG. 5, it is not limited thereto, and a plurality of candidate reference value indicators may be displayed, or the candidate reference value indicator may be displayed in a range.

Figure 6:
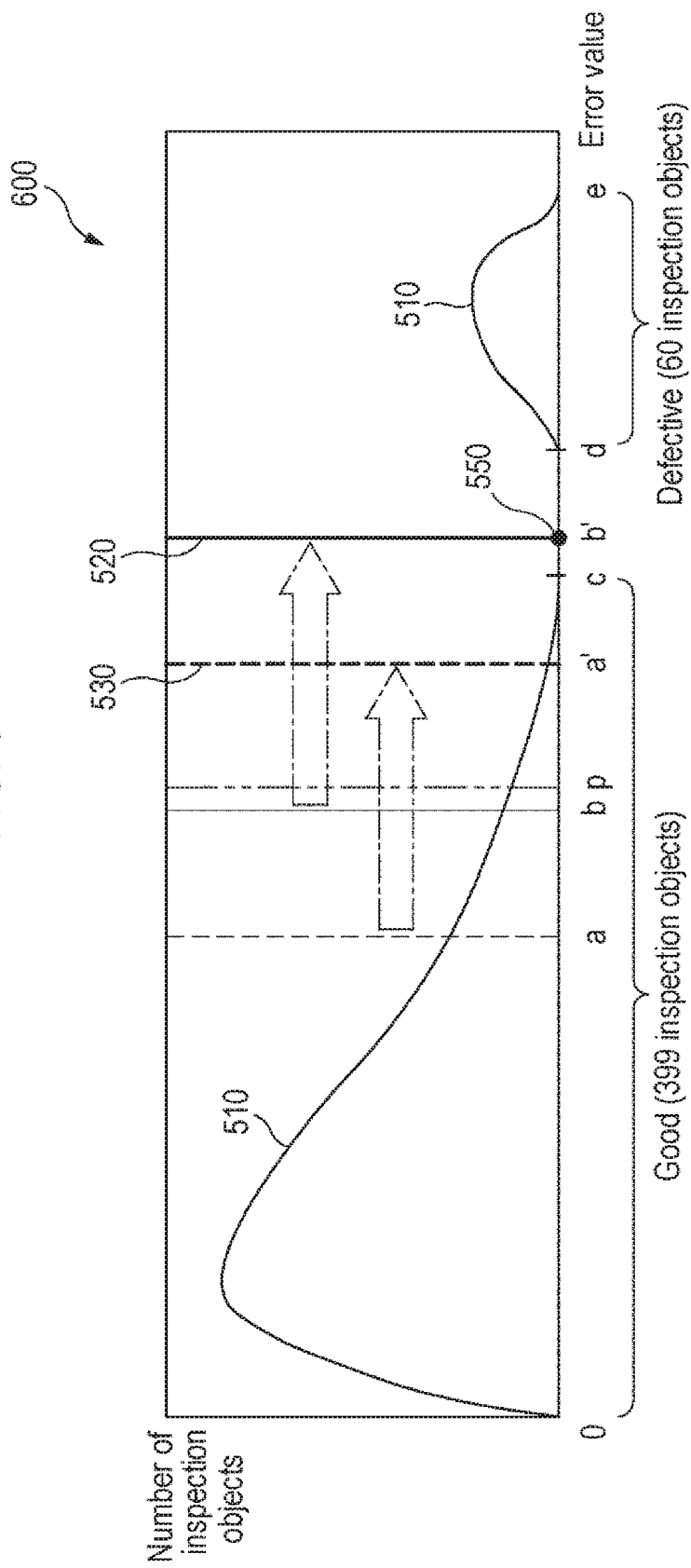
FIG. 6 is a view illustrating an update of a reference value on an inspection result graph according to an embodiment of the present disclosure.

FIG. 6 is a view illustrating an update of a reference value on an inspection result graph 600 according to an embodiment of the present disclosure. According to an embodiment, the inspection result graph 600 in FIG. 6 may be obtained from the inspection result graph 500 in FIG. 5 by updating the reference value thereof.

According to an embodiment, the user may update the reference value on the inspection result graph 600 through the user input unit 322. For example, the user may drag the first reference value GUI 520 to the position of the candidate reference value indicator 550 on the inspection result graph 600 using a mouse as the user input unit 322. As another example, the user may touch the position of the candidate reference value indicator 550 on the inspection result graph 600 using a touchpad. As described above, the position of the first reference value GUI 520 on the inspection result graph 600 is shifted by a graphical input through the user input unit 322. In addition, as the position of the first reference value GUI 520 is shifted, the first reference value may be updated as well. For example, as illustrated in FIG. 6, the first reference value is updated from the value "b" to a value "b'".

According to an embodiment, as the position of the first reference value GUI 520 is shifted, the position of the second reference value GUI 530 may also be shifted without a separate user input. For example, if the ratio of the second reference value to the first reference value is set to 90%, the second reference value GUI 530 may be moved to the right such that the second reference value becomes 90% of the updated first reference value. As illustrated in FIG. 6, as the first reference value GUI 520 moves, the second reference value GUI 530 may also move such that the second reference value is updated from the value "a" to a value "a'" corresponding to 90% of the value "b'". According to another embodiment, the second reference value GUI 530 may be moved by a graphical input of the second reference value 530 on the inspection result graph 600 through the user input unit 322.

According to an embodiment, in response to the shift of the first and second reference value GUIs 520 and 530, the quality determination unit 332 may perform quality redetermination for the respective inspection objects based on the updated first and second reference values. The quality determination unit 332 may determine each inspection object to be "good" if the error value of the inspection object is equal to or less than the first reference value "b'", and may determine each inspection object to be "defective" if the error value of the inspection object exceeds the value "b'". In addition, if the error value of the inspection object is greater than the second reference value "a'" and equal to or less than the value "b'", the quality determination unit 332 may determine the inspection object to be "warning". In addition, the quality determination unit 332 may identify the inspection object in which a redetermination error has occurred, among the inspection objects.

The quality determination results and the determination review results may be displayed on the inspection result graph 600. As illustrated in FIG. 6, 399 inspection objects having error values equal to or less than the value "b'" are determined to be "good", 12 inspection objects having error values greater than the value "a'" and equal to or less than the value "b'" are determined to be "warning", and 60 inspection objects having error values equal to or greater than the value "d" and equal to or less than the value "e" are determined to be "defective". In comparison with the inspection result graph 500 in FIG. 5, the number of inspection objects with errors for quality determination is reduced from 47 in FIG. 5 to zero in FIG. 6. In other words, the quality determination error is minimized by updating the first reference value used as a criterion for quality determination of the inspection object.

As described above, the first reference value GUI 520 is moved by a graphical input of the user, so that the quality determination device 300 may newly determine whether the inspection object is good or defective according to the updated reference value. That is, unlike the conventional process in which the user must visually check the measurement values one by one to determine a new reference value and must input the same in a numerical value, according to the present disclosure, the user is able to determine a new reference value while viewing the inspection result graph and is able to update the reference value by a graphical input. As a result, it is possible to change the first reference value by moving the first reference value GUI 520 while the determination error is visually displayed, thereby correcting the determination error quickly and conveniently. In addition, it is possible to newly determine whether the inspection object is good or defective based on the updated reference value, thereby assuring the user's convenience.

Figure 7:
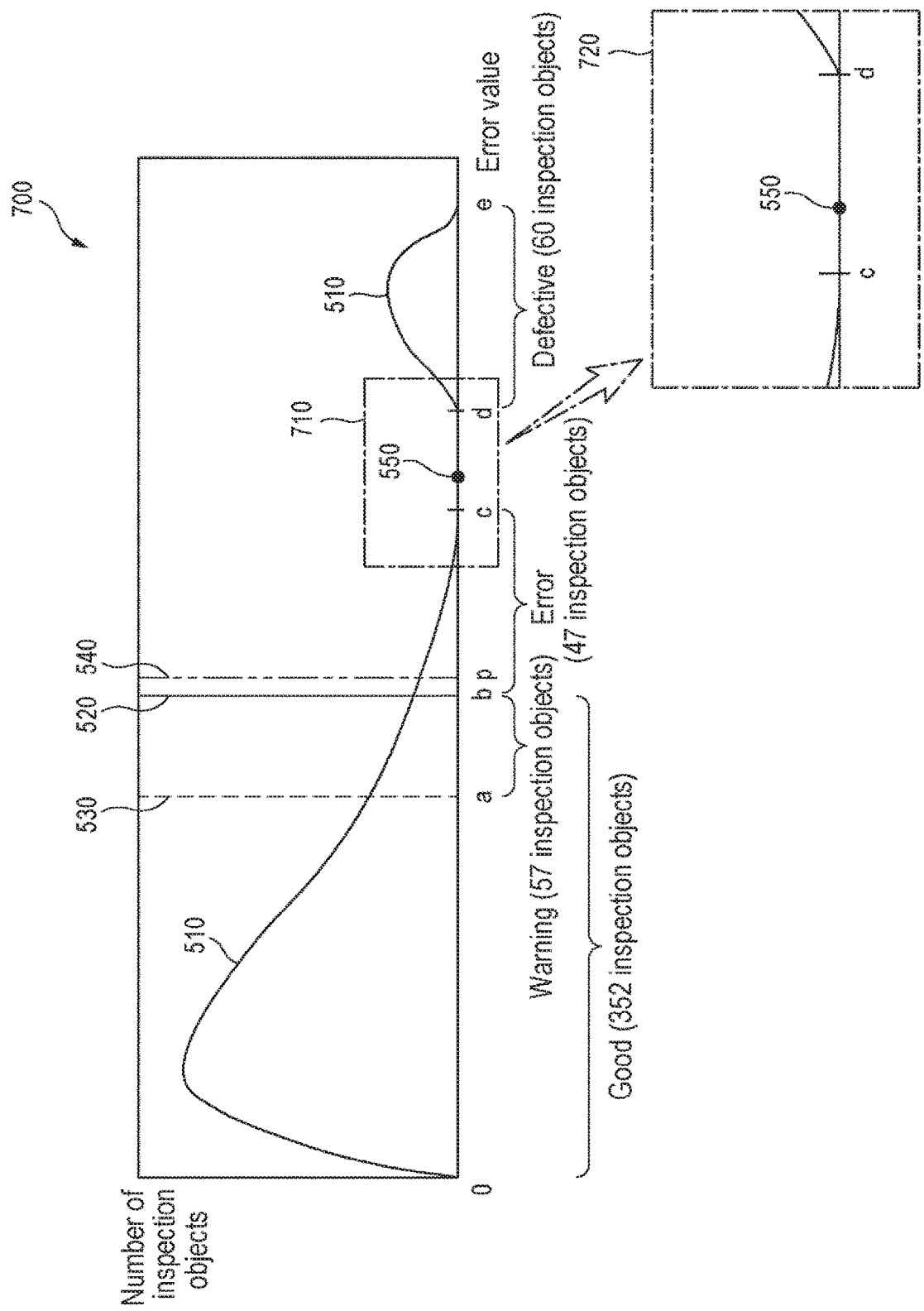
FIG. 7 is a view illustrating an inspection result graph in which a partial area is enlarged according to an embodiment of the present disclosure.

FIG. 7 is a view illustrating an inspection result graph 700 in which a partial area is enlarged according to an embodiment of the present disclosure. The inspection result graph 700 in FIG. 7 is a graph indicating a result of the quality determination and a result of the determination review of the inspection objects, and may be the same as the inspection result graph 500 in FIG. 5.

According to an embodiment, the user may enlarge at least a portion of the inspection result graph 700, which is output through the output unit 324, using the user input unit 322. As an example, the user may select a predetermined area 710 on the inspection result graph 700 using a mouse as the user input unit 322. In response to the selection of the predetermined area 710, the determination result generation unit 334 may generate an enlarged graph 720 obtained by enlarging the predetermined area 710. The generated enlarged graph 720 may be output through the output unit 324. The enlarged graph 720 may be output separately from the inspection result graph 700, or may be output on the inspection result graph 700 so as to overlap the same.

Figure 8:
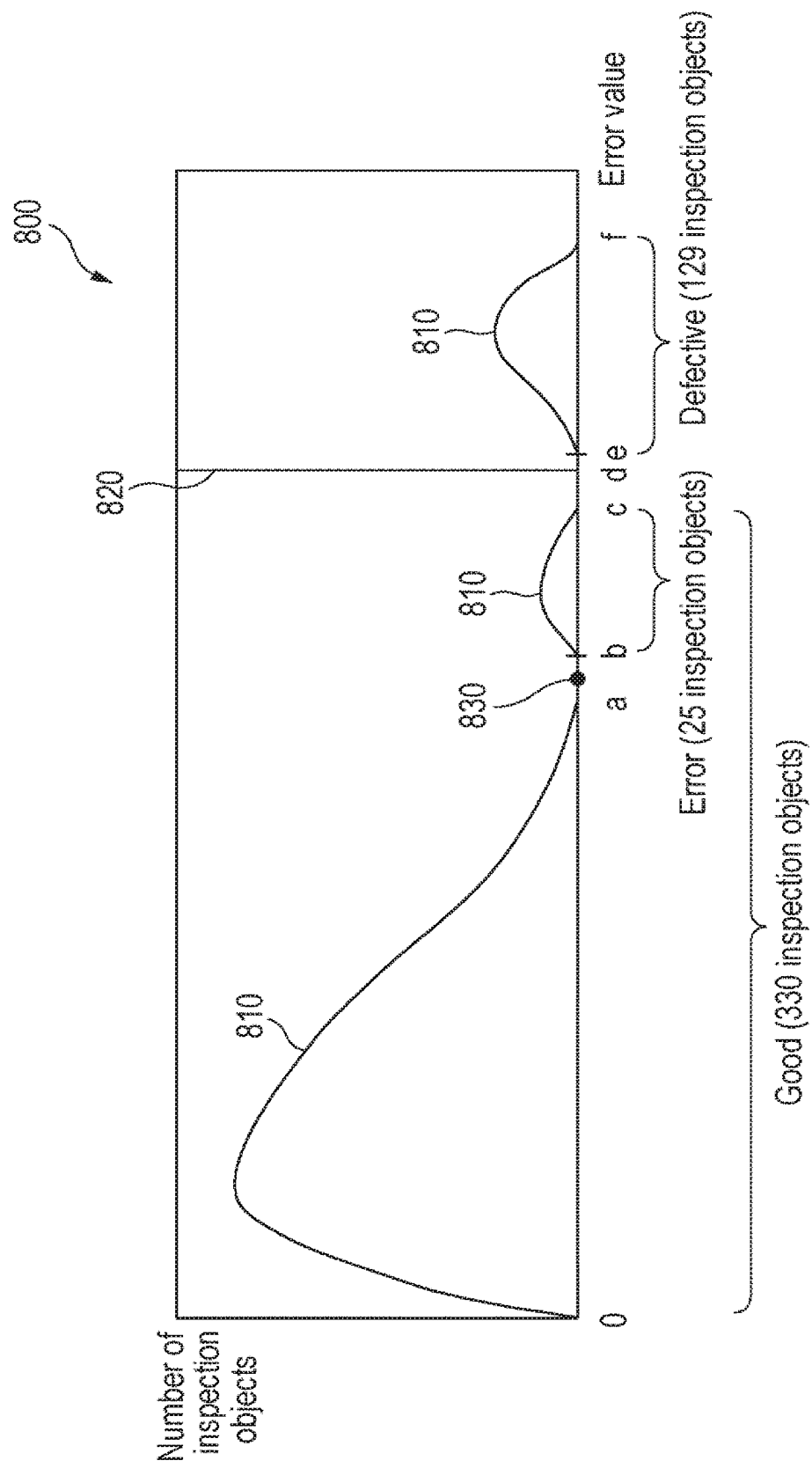
FIG. 8 is a view illustrating an inspection result graph indicating a result of a quality determination and a review result of the quality determination according to an embodiment of the present disclosure.

FIG. 8 is a view illustrating an inspection result graph 800 indicating a result of a quality determination and a review result of the quality determination according to an embodiment of the present disclosure. According to a plurality of embodiments, the inspection result graph 800 in FIG. 8 may be generated by the determination result generation unit 334, and may be output through the output unit 324 in FIG. 3. According to an embodiment, the inspection result graph 800 in FIG. 8 may be generated in response to reception of an input for selecting any one of inspection result data (e.g., the inspection result data 460) from the inspection result list 400 in FIG. 4 through the user input unit 322.

The inspection result graph 800 includes a curve 810 indicating the number of inspection objects having corresponding error values and a reference value GUI 820 indicating a reference value used for quality determination of the inspection object. As illustrated in FIG. 8, 330 inspection objects having error values equal to or less than a first reference value "d" are determined to be "good", and 129 inspection objects having error values between a value "e" and a value "f", which are greater than the first reference value "d", are determined to be "defective". In this case, although 25 inspection objects having error values between a value "b" and a value "c", among the 330 inspection objects determined to be good, are determined to be "good", since the 25 inspection objects are out of a natural error distribution pattern of a given process (from zero to the value "a"), they may be actually defective due to some problems other than the given process. Thus, the 25 inspection objects between the value "b" and the value "c" may be determined to have the first type of error (escape).

Although problems in the process, which cause the abnormal error values between the value "e" and the value "f", are solved, if the first reference value is maintained to be the value "d", error values will be naturally distributed between zero and the value "a" in the normal process. Thus, if products continue to be produced using the process, a significant number of products produced subsequently will continue to have the error values below the first reference value "d", and will be determined to be "good" despite the products are actually defective. That is, in the example illustrated in FIG. 8, if the production process itself is not erroneous, the first reference value for determining to be good and to be defective may be regarded as being set to be too loose without reflecting the characteristics of the natural error distribution in the production process.

The inspection result graph 800 may include a candidate reference value indicator 830 indicating a candidate reference value to minimize the number of inspection objects in which determination error has occurred. The candidate reference value may be a candidate for a reference value, which minimizes the number of inspection objects (e.g., 0) determined to be "error", and may be selected from the range of error values between the value "a" and the value "b". Although the candidate reference value indicator 830 is denoted by a dot in FIG. 8, it is not limited thereto, and the candidate reference value indicator 830 may be displayed in any of various forms such as an arrow, a line, and a square. In addition, although a single candidate reference value indicator 830 is displayed in FIG. 8, it is not limited thereto, and a plurality of candidate reference value indicators 830 may be displayed, or the candidate reference value indicator 830 may be displayed in a range. In addition, although not illustrated in FIG. 8, the inspection result graph 800 according to an embodiment may include a GUI indicating a reference value used for determining the inspection object corresponding to "warning", among the inspection objects determined to be "good", and an indicator indicating error values of any one of the plurality of inspection objects.

Figure 9:
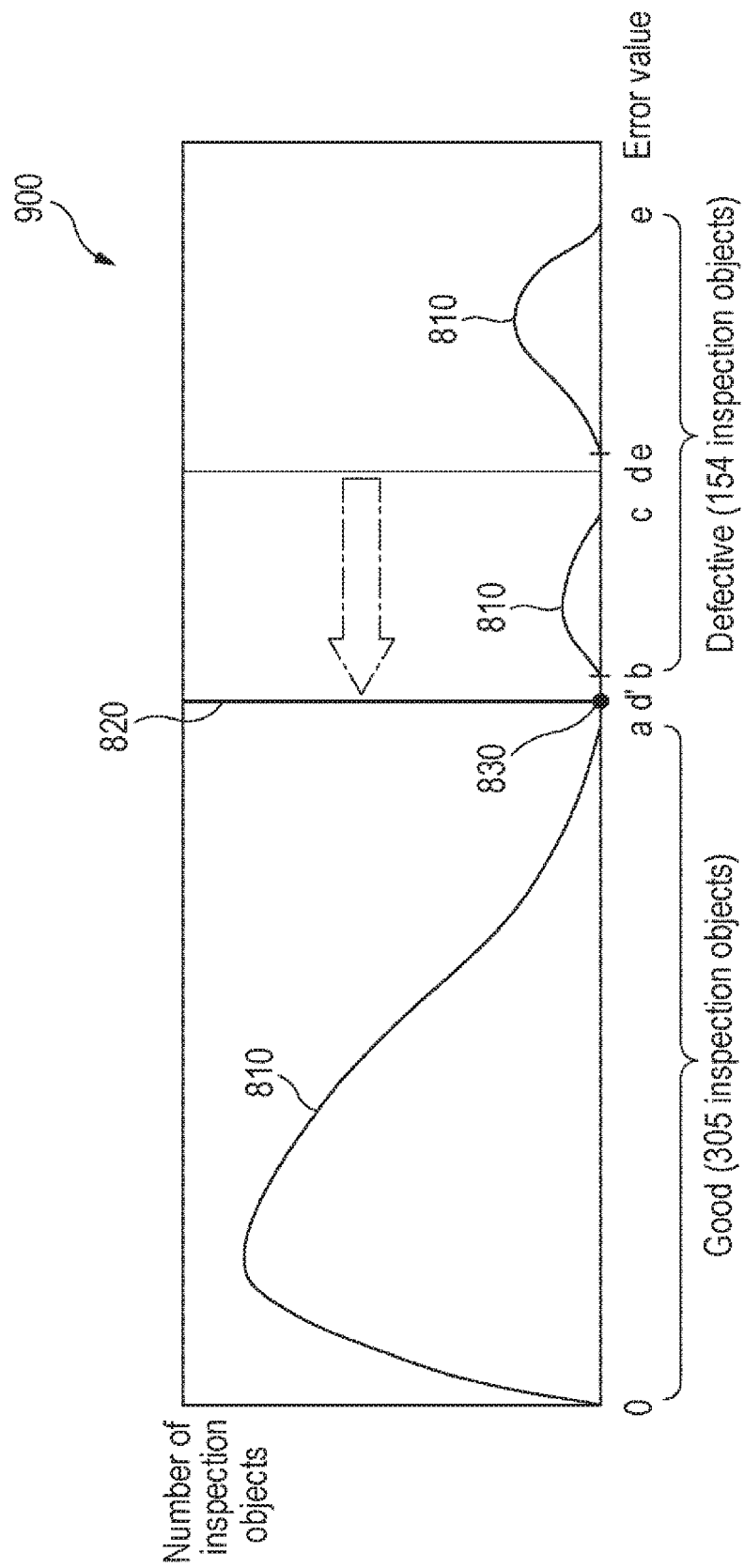
FIG. 9 is a view illustrating an inspection result graph in which a reference value is updated according to an embodiment of the present disclosure.

FIG. 9 is a view illustrating an inspection result graph 900 in which a reference value is updated according to an embodiment of the present disclosure. According to an embodiment, the inspection result graph 900 in FIG. 9 may be obtained from the inspection result graph 800 in FIG. 8 by updating the reference value thereof.

According to an embodiment, the user may update the reference value on the inspection result graph 900 through the user input unit 322. For example, the user may drag the reference value GUI 820 to the position of the candidate reference value indicator 830 on the inspection result graph 900 using a mouse as the user input unit 322. As another example, the user may touch the position of the candidate reference value indicator 830 on the inspection result graph 900 using a touchpad. As described above, the position of the reference value GUI 820 is shifted on the inspection result graph 900 by a graphical input through the user input unit 322. In addition, as the position of the reference value GUI 820 is shifted, the reference value may be updated as well. For example, as illustrated in FIG. 9, the reference value is updated from the value "d" to a value "d'".

According to an embodiment, in response to the shift of the reference value GUI 820, the quality determination unit 332 may perform quality redetermination for the respective inspection objects based on the updated reference value. The quality determination unit 332 may determine each inspection object to be "good" if the error value of the inspection object is equal to or less than the reference value "d'", and may determine each inspection object to be "defective" if the error value of the inspection object exceeds the value "d'". In addition, the quality determination unit 332 may identify the inspection object in which a redetermination error has occurred, among the inspection objects.

The result of the quality redetermination and the result of the redetermination review may be displayed on the inspection result graph 900. As illustrated in FIG. 9, 305 inspection objects having error values equal to or less than the value "d'" are determined to be "good", and 154 inspection objects having error values exceeding the value "d'" are determined to be "defective". In comparison with the inspection result graph 800 in FIG. 8, the number of inspection objects with errors for quality determination is reduced from 25 in FIG. 8 to zero in FIG. 9. In other words, the quality determination error is minimized by updating the reference value used as a criterion for quality determination of the inspection objects.

FIG. 10 is a flowchart illustrating a method for adjusting a condition for determining a quality of inspection objects according to an embodiment of the present disclosure. At least some of the steps illustrated in FIG. 10 may be performed by the configurations illustrated in FIGS. 1 to 3.

First, in step S1000, the quality determination device 300 acquires measurement values of structures of a plurality of inspection objects. For example, the measurement device 100 may irradiate light to the inspection object, may receive the light reflected from the inspection object, and may generate image data of the inspection object based on the received light. In addition, the measurement device 100 may generate measurement values by measuring the structure of the inspection object based on the image data. The quality determination device 300 may obtain the measurement values generated by the measurement device 100 through the communication unit 310.

Next, in step S1010, the quality determination unit 332 may perform quality determination for the respective inspection objects. For example, the quality determination unit 332 may determine whether the inspection object is good or defective by determining whether or not the measurement values obtained in step S1000 fall within predetermined ranges. The quality determination unit 332 may obtain error values between the measurement values and design values of the structure of the inspection object, and may compare the obtained error values with a predetermined reference value. The quality determination unit 332 may determine the inspection object having an error value equal to or less than the predetermined reference value to be "good", and may determine the inspection object having an error value exceeding the predetermined reference value to be "defective (NG)".

Next, in step S1020, the determination result generation unit 334 identifies the inspection object in which a determination error has occurred, among the plurality of inspection objects. For example, the determination result generation unit 334 identifies the inspection object in which a determination error has occurred, among the plurality of inspection objects, based on the quality determination results of the inspection objects obtained in step S1010 and the result of the determination review by the determination review device 140. Here, the determination error includes a first error in which an inspection object determined to be "good" is actually identified "defective" and a second error in which an inspection object determined to be "defective" is actually identified to be "good".

According to an embodiment, the determination review device 140 may determine a distribution of the good error values and a distribution of the defective error values (if any) based on the distribution of the error values of the inspection objects 20, which are measured by the measurement device 100, and may estimate a range of the good error values and a range of the defective error values (if any) from the distribution of the good error values and the distribution of the defective error values (if any). In addition, the determination review device 140 may identify the inspection object 20 in which a determination error has occurred, among the inspection objects 20, based on the range of the good error values and the range of the defective error values (if any). In addition, the determination result generation unit 334 may receive the result of the determination review from the determination review device 140, and may identify the inspection object 20 in which the determination error has occurred.

Next, in step S1030, the determination result generation unit 334 outputs inspection result graph. For example, the determination result generation unit 334 generates an inspection result graph indicating the number of inspection objects according to error values. The inspection result graph may be a two-dimensional graph in which the horizontal axis indicates error values and the vertical axis indicates the number of inspection objects having corresponding error values, among the plurality of inspection objects. The determination result generation unit 334 may display, on the inspection result graph, a GUI object having a bar shape, which is movable by manipulation of a user, as a reference value. In addition, the determination result generation unit 334 may display "good", "warning", and "defective" as the result of the quality determination on the inspection result graph. In addition, the determination result generation unit 334 may display the review result of the quality determination results on the inspection result graph. In addition, the determination result generation unit 334 may determine at least one candidate reference value to minimize the number of one or more inspection objects in which the determination error has occurred, and may display the same on the inspection result graph.

According to an embodiment, the candidate reference value may be determined based on the range of the good error values and the range of the defective error values (if any), which are estimated in step S1020. If the range of the defective error values is provided, the candidate reference value may be selected from among values equal to or greater than the maximum value of the range of the good error values and equal to or less than the minimum value of the range of the defective error values. If no range of the defective error values is provided, the candidate reference value may be selected from among values equal to or greater than the maximum value of the range of the good error values.

Next, in step S1040, the determination reference adjustment unit 336 updates the reference value according to a graphical input on the inspection result graph. The user may provide a graphical input on the inspection result graph so as to reduce the number of one or more inspection objects in which the determination error has occurred. For example, the user may drag the GUI indicating the reference value to a predetermined position on the inspection result graph 600 using a mouse as the user input unit 322. The determination reference adjustment unit 336 updates the reference value with a predetermined value in response to the graphical input of the user (i.e., an input for moving the GUI indicating the reference value).

Next, in step S1050, the quality determination unit 332 performs quality redetermination for the respective inspection objects based on the updated reference value. For example, the quality determination unit 332 compares the reference value updated in step S1040 with the error values, thereby redetermining each of the plurality of inspection objects is good or defective. In addition, the quality determination unit 332 identifies the inspection object in which a redetermination error has occurred, among the plurality of inspection objects. In addition, the determination result generation unit 336 displays, on the inspection result graph, the updated reference value and the number of inspection objects in which the redetermination error has occurred.

Some of the steps illustrated in FIG. 10 may be omitted, two or more steps thereof may be executed at the same time, or the execution order between steps may be changed. In addition, while a method of adjusting a condition for determining the quality of inspection objects has been described through the specific embodiments, the method may also be implemented as computer-readable codes on a computer-readable recording medium. The computer-readable recording medium includes any kind of data storage devices that can be read by a computer system. The computer-readable recording medium may include ROM, RAM, CD-ROM, magnetic tapes, floppy disks, optical data storage devices, and the like. In addition, the computer-readable recording medium may be distributed over computer systems connected through a network so that the computer-readable codes may be stored and executed in a distribution manner. Further, functional programs, codes, and code segments for implementing the above embodiments may be easily inferred by programmers in the art to which the present disclosure pertains.

While the present disclosure has been described and illustrated through preferred embodiments, it will be understood by those skilled in the art that various modifications and changes can be made without departing from the subject matter and scope of the appended claims.

What is claimed is:

1. A method for adjusting a condition for determining a quality of an inspection object in a quality determination device comprising a database, a processor, a user input device, and an output device, the method comprising:
   acquiring, by the processor, measurement values for structures of a plurality of inspection objects from the database;
   calculating, by the processor, an error value for each of the plurality of inspection objects by comparing the measurement values for structures of the plurality of inspection objects with design values of the structures of the plurality of inspection objects respectively;
   determining, by the processor, whether each of the plurality of inspection objects is good or defective based on the error value for each of the plurality of inspection objects and a reference value which is used for determining whether each of the plurality of inspection objects is good or defective;
   determining, by the processor, a distribution of good error values based on a distribution of the error values;
   identifying, by the processor, one or more inspection objects in which a determination error has occurred based on the distribution of good error values, among the plurality of inspection objects;
   generating, by the processor, a graph comprising a GUI (Graphic User Interface) object indicating the reference value, the number of the one or more inspection objects in which the determination error has occurred and a result of determining whether each of the plurality of inspection objects is good or defective, and displaying the graph through the output device;
   receiving a user input for moving a position of the GUI object through the user input device;
   updating, by the processor, the reference value with a value corresponding to the position of the GUI object moved according to the user input; and
   re-determining, by the processor, whether each of the plurality of inspection objects is good or defective based on the updated reference value.

2. The method of claim 1, wherein the re-determining comprises:
   identifying one or more inspection objects in which a re-determination error has occurred, among the plurality of inspection objects; and
   displaying the updated reference value and the number of the one or more inspection objects in which the re-determination error has occurred, through the output device.

3. The method of claim 1,
   wherein the determination error comprises a first error in which an inspection object determined to be good is identified to be defective and a second error in which an inspection object determined to be defective is identified to be good, and
   wherein the identifying the one or more inspection objects comprises receiving determination review result indicating whether the plurality of inspection objects have the first error or the second error.

4. The method of claim 3, wherein the identifying the one or more inspection objects comprises:
   estimating a range of the good error values from the distribution of the good error values; and
   identifying the first error or the second error based on the range of the good error values.

5. The method of claim 3, wherein the displaying the graph comprises:
  displaying, as the graph, a two-dimensional graph in which a horizontal axis indicates the error values and a vertical axis indicates the number of inspection objects having corresponding error values, among the plurality of inspection objects; and
  displaying, on the graph, a bar-shaped GUI object that is movable by a user input.

6. The method of claim 3, wherein the displaying the graph comprises:
  determining at least one candidate reference value to minimize the number of the one or more inspection objects in which the determination error has occurred; and
  displaying the at least one candidate reference value on the graph.

7. The method of claim 6, wherein the determining the at least one candidate reference value comprises determining, based on a range of good error values stored in the database, at least one of values greater than or equal to a maximum value of the range of the good error values to be the at least one candidate reference value, and
  wherein the range of the good error values is estimated by a determination review device based on a distribution of the error values.

8. The method of claim 6, wherein the determining the at least one candidate reference value comprises determining, based on a range of good error values and a range of defective error values stored in the database, at least one of values greater than or equal to a maximum value of the range of good error values and less than or equal to a minimum value of the range of defective error values to be the at least one candidate reference value, and
  wherein the range of good error values and the range of defective error values are estimated by a determination review device based on a distribution of the error values.

9. A non-transitory computer-readable recording medium recording a program to be executed in a computer, wherein the program includes executable instructions that instruct a processor, when executed by the processor, to perform:
  acquiring measurement values for structures of a plurality of inspection objects from a database;
  calculating, by the processor, an error value for each of the plurality of inspection objects by comparing the measurement values for structures of the plurality of inspection objects with design values of the structures of the plurality of inspection objects, respectively;
  determining, by the processor, whether each of the plurality of inspection objects is good or defective based on the error value for each of the plurality of inspection objects and a reference value which is used for determining whether each of the plurality of inspection objects is good or defective;
  determining, by the processor, a distribution of good error values based on a distribution of error values;
  identifying by the processor, one or more inspection objects in which a determination error has occurred based on the distribution of good error values, among the plurality of inspection objects;
  generating a graph comprising a GUI (Graphic User Interface) object indicating the reference value, the number of the one or more inspection objects in which the determination error has occurred and a result of determining whether each of the plurality of inspection objects is good or defective and displaying the graph through an output device;
  receiving a user input for moving a position of the GUI object through a user input device;
  updating the reference value with a value corresponding to the position of the GUI object moved according to the user input; and
  re-determining whether each of the plurality of inspection objects is good or defective based on the updated reference value.

10. A device for adjusting a condition for determining a quality of an inspection object, the device comprising:
  a database configured to store measurement values for structures of a plurality of inspection objects;
  an output device;
  a user input device configured to receive a user input for moving a position of the GUI object; and
  a processor configured to:
  acquire the measurement values for structures of a plurality of inspection objects from the database,
  calculate an error value for each of the plurality of inspection objects by comparing the measurement values for structures of the plurality of inspection objects with design values of the structures of the plurality of inspection objects, respectively,
  determine whether each of the plurality of inspection objects is good or defective based on the error value for each of the plurality of inspection objects and a reference value which is used for determining whether each of the plurality of inspection objects is good or defective,
  determine a distribution of good error values based on a distribution of the error values,
  identify one or more inspection objects in which a determination error has occurred based on the distribution of good error values, among the plurality of inspection objects,
  generate a graph comprising a GUI (Graphic User Interface) object indicating the reference value, the number of the one or more inspection objects in which the determination error has occurred and a result of determining whether each of the plurality of inspection objects is good or defective, and display the graph through the output device,
  update the reference value with a value corresponding to the position of the GUI object moved according to the user input, and
  re-determine whether each of the plurality of inspection objects is good or defective based on the updated reference value.

11. The device of claim 10, wherein the processor identifies one or more inspection objects in which a redetermination error has occurred, among the plurality of inspection objects, and
  displays the updated reference value and the number of the one or more inspection objects in which the redetermination error has occurred, through the output device.

12. The device of claim 10, wherein the database further stores design values for the structures of the plurality of inspection objects,
  wherein the determination error comprises a first error in which an inspection object determined to be good is identified to be defective and a second error in which an inspection object determined to be defective is identified to be good, and wherein the device for adjusting the condition further comprises a communication unit configured to receive determination review results indicating whether the plurality of inspection objects have the first error or the second error.

13. The device of claim 12, wherein the processor estimates a range of the good error values from the distribution of the good error values and identifies the first error or the second error based on the range of the good error values.

14. The device of claim 12, wherein the processor displays, as the graph, a two-dimensional graph in which a horizontal axis indicates the error values and a vertical axis indicates the number of inspection objects having corresponding error values, among the plurality of inspection objects and displays, on the graph, a bar-shaped GUI object that is movable by a user input.

15. The device of claim 12, wherein the processor displays, on the graph, at least one candidate reference value to minimize the number of the one or more inspection objects in which the determination error has occurred.

16. The device of claim 15, wherein the database further stores a range of good error values,
wherein the processor determines, based on the range of the good error values stored in the database, at least one of values greater than or equal to a maximum value of the range of the good error values to be the at least one candidate reference value, and
wherein the range of the good error values is estimated by a determination review device based on a distribution of the error values.

17. The device of claim 15, wherein the database further stores a range of good error values and a range of defective error values,
wherein the processor determines, based on the range of the good error values and the range of the defective error values stored in the database, at least one of values greater than or equal to a maximum value of the range of the good error values and less than or equal to a minimum value of the range of the defective error values to be the at least one candidate reference value, and
wherein the range of the good error values and the range of the defective error values are estimated by a determination review device based on a distribution of the error values.

18. The device of claim 12, wherein, the processor, in response to an input for setting a predetermined area on the graph, enlarges and outputs the predetermined area.

* * * * *